US010865724B2

(12) United States Patent
Woodring et al.

(10) Patent No.: US 10,865,724 B2
(45) Date of Patent: Dec. 15, 2020

(54) SYSTEMS AND METHODS FOR CHARACTERIZATION OF AGED FUEL FOR AN ENGINE COLD START

(71) Applicant: Ford Global Technologies, LLC, Dearborn, MI (US)

(72) Inventors: Christopher Woodring, Canton, MI (US); Gopichandra Surnilla, West Bloomfield, MI (US); Mohannad Hakeem, Dearborn, MI (US); Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 15/876,987

(22) Filed: Jan. 22, 2018

(65) Prior Publication Data

US 2019/0226415 A1  Jul. 25, 2019

(51) Int. Cl.
*F02D 41/06* (2006.01)
*F02D 41/24* (2006.01)
*F02D 41/14* (2006.01)
*F02D 41/30* (2006.01)
*G05D 1/00* (2006.01)
*F02M 25/08* (2006.01)
*F02D 35/02* (2006.01)

(52) U.S. Cl.
CPC ....... *F02D 41/064* (2013.01); *F02D 41/1498* (2013.01); *F02D 41/2422* (2013.01); *F02D 41/3094* (2013.01); *F02D 35/027* (2013.01); *F02D 2200/0602* (2013.01); *F02D 2200/0606* (2013.01); *F02D 2200/0608* (2013.01); *F02D 2200/0611* (2013.01); *F02D 2200/0612* (2013.01); *F02M 25/08* (2013.01); *G05D 1/0088* (2013.01)

(58) Field of Classification Search
CPC ............. F02D 41/2422; F02D 41/1498; F02D 41/064; F02D 41/3094; F02D 35/027; F02D 2200/0612; F02D 2200/0611; F02D 2200/0608; F02D 2200/0602; F02D 2200/0606; G05D 1/0088; F02M 25/08
See application file for complete search history.

(56) References Cited

U.S. PATENT DOCUMENTS

| 8,694,186 B2 | 4/2014 | Syed et al. |
| 9,581,101 B2 * | 2/2017 | Huber ............... F02D 41/30 |
| 9,850,853 B2 * | 12/2017 | Dudar ............... F02D 41/22 |
| 2006/0031000 A1 * | 2/2006 | Amano ........... F02M 25/0818 |
| | | 701/114 |

(Continued)

*Primary Examiner* — Sizo B Vilakazi
(74) *Attorney, Agent, or Firm* — Geoffrey Brumbaugh; McCoy Russell LLP

(57) ABSTRACT

Methods and systems are provided for characterizing aged fuel, which loses volatility over time. In one example, a method may include estimating a fuel vapor pressure during an engine cold start using a pre-determined fuel distillation curve and adjusting one or more combustion parameters based on the estimated fuel vapor pressure. Because the fuel vapor pressure directly relates to the fuel volatility, adjusting the one or more combustion parameters based on the estimated fuel vapor pressure may reduce aged fuel-related engine performance degradation, such as hesitation and emissions during cold start.

20 Claims, 6 Drawing Sheets

(56) References Cited

U.S. PATENT DOCUMENTS

| | | | |
|---|---|---|---|
| 2010/0332108 A1* | 12/2010 | Kato | F02D 33/02 701/104 |
| 2012/0185147 A1* | 7/2012 | Beer | F02D 41/20 701/102 |
| 2013/0013173 A1* | 1/2013 | Tsunooka | F02D 33/006 701/104 |
| 2013/0030616 A1* | 1/2013 | Syed | F02D 41/0025 701/22 |
| 2013/0276756 A1* | 10/2013 | Leone | F02D 41/064 123/445 |
| 2014/0297159 A1* | 10/2014 | Surnilla | F02D 41/3094 701/103 |
| 2015/0142297 A1* | 5/2015 | Kojima | F02D 41/3076 701/104 |

* cited by examiner

SYSTEMS AND METHODS FOR CHARACTERIZATION OF AGED FUEL FOR AN ENGINE COLD START

FIELD

The present description relates generally to methods and systems for controlling a vehicle engine during a cold start.

BACKGROUND/SUMMARY

Fuel volatility may impact a starting performance of an engine, which may be included in a vehicle. As one example, lower molecular weight hydrocarbons (also referred to herein as "light ends," such as one-carbon methane to four-carbon butane) may evaporate as the fuel ages, leaving a higher percentage of less volatile, higher molecular weight hydrocarbons in the fuel (also referred to herein as "heavy ends," such as seven-carbon heptane and above). Fuel aging may be exacerbated in hybrid electric vehicle (HEV) systems because the engine may be used intermittently, and thus, the fuel may be consumed slowly. The aged, lower volatility fuel (also referred to as "hesitation fuel") may lead to engine hesitation during a cold start, resulting in vehicle emissions during the cold start and customer dissatisfaction. Thus, various approaches may be used for adjusting combustion during a cold start to compensate for aged fuel.

One example of a method for fuel injection control during an engine start that compensates for fuel age is shown by Huber et al. in U.S. Pat. No. 9,581,101 B2. Therein, an adaptation factor, which represents fuel aging, is determined from a model of the fuel, a fuel mass evaporated through a fuel tank vent, and various system temperatures (e.g., ambient temperature, engine temperature, and manifold air temperature). Using the adaptation factor, a fuel injection quantity and/or timing is adjusted.

However, the inventors herein have recognized potential issues with such methods, mainly due to the fact that it does not account for the chemical properties of the fuel. As one example, an amount of fuel evaporated may not be an accurate indication of the volatility of the remaining fuel. As a result, adjustments to the fuel injection quantity and/or timing may be inaccurate. Therefore, engine hesitation and vehicle emissions during engine start may not be sufficiently mitigated.

In one example, the issues described above may be addressed by a method comprising: during a cold start of a fuel burning engine, estimating a vapor pressure of fuel stored in a fuel tank via a pre-determined fuel distillation curve; and adjusting combustion parameters based on the estimated vapor pressure. In this way, the fuel vapor pressure, and therefore the fuel volatility, may be accurately estimated.

As one example, the pre-determined distillation curve is selected from a plurality of pre-determined fuel distillation curves included in a physics-based model. For example, the pre-determined fuel distillation curve may be selected based on one or more of an alcohol content, an octane number, and an age of the fuel. A controller may input a fuel temperature and a fuel tank pressure into the physics-based model to determine the estimated fuel vapor pressure, for example, which may then be used to adjust the combustion parameters. In some examples, the fuel temperature is estimated from an ambient temperature, and the fuel tank pressure is estimated from an ambient pressure. The combustion parameters may include one or more of a fuel injection amount, a fuel injection timing, a port fuel injection versus direct fuel injection fraction, a commanded air-fuel ratio, and an ignition timing. In this way, the combustion parameters may be optimized for the estimated fuel vapor pressure (and thus the fuel volatility, which decreases as the fuel ages), thereby reducing engine hesitation and vehicle emissions during the engine start.

The inventors herein have further recognized that the ambient temperature and ambient pressure may not accurately represent the fuel temperature and the fuel tank pressure, respectively, depending on ambient conditions and an amount of time the engine has been off, for example. As a result, the combustion parameters may not be fully optimized by using the ambient temperature and the ambient pressure to estimate the fuel vapor pressure. For example, if the combustion parameters are over- or under-adjusted, engine hesitation may still occur and/or fuel economy may be reduced, for example, depending on the specific combustion parameter and the adjustment made.

Therefore, as another example, a method includes, in response to an engine start request during a cold start condition, estimating a volatility of fuel stored in a fuel tank using a physics-based model; determining a confidence in the estimated volatility based on a duration of engine inactivity; and adjusting an injection amount and an injection timing of fuel delivered to the engine from the fuel tank based on the estimated volatility and the determined confidence. By adjusting the injection amount and the injection timing based on the determined confidence, over- and under-adjustments may be reduced, thereby further reducing engine hesitation and increasing fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
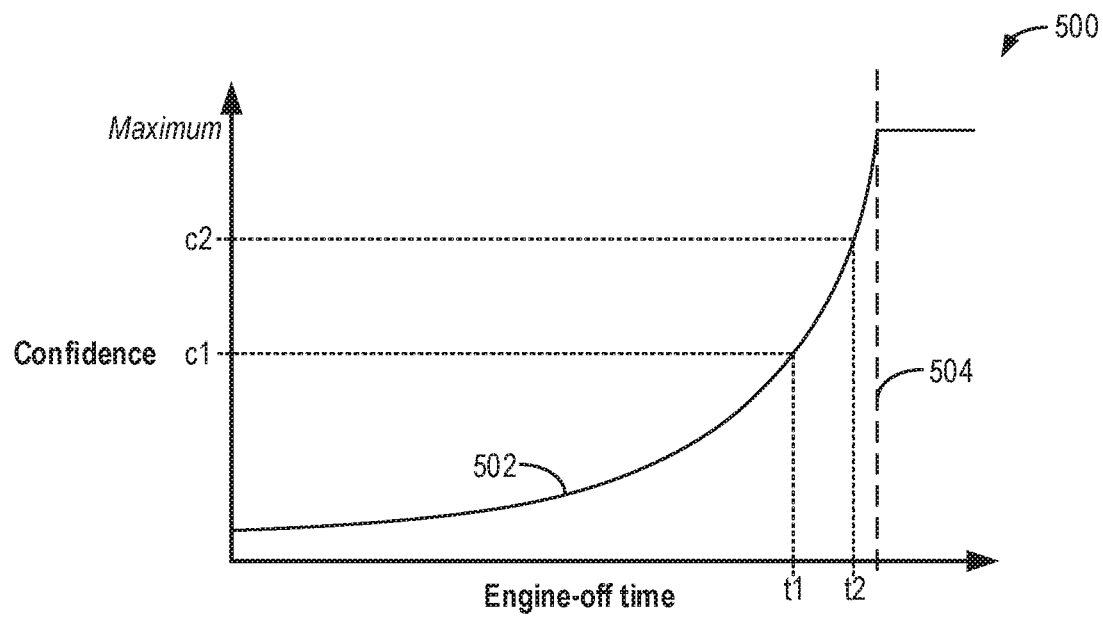
FIG. 5 shows example relationships between an engine-off time, a confidence in an estimated vapor pressure, and a degree of an adjustment to a combustion parameter.
Figure 5:
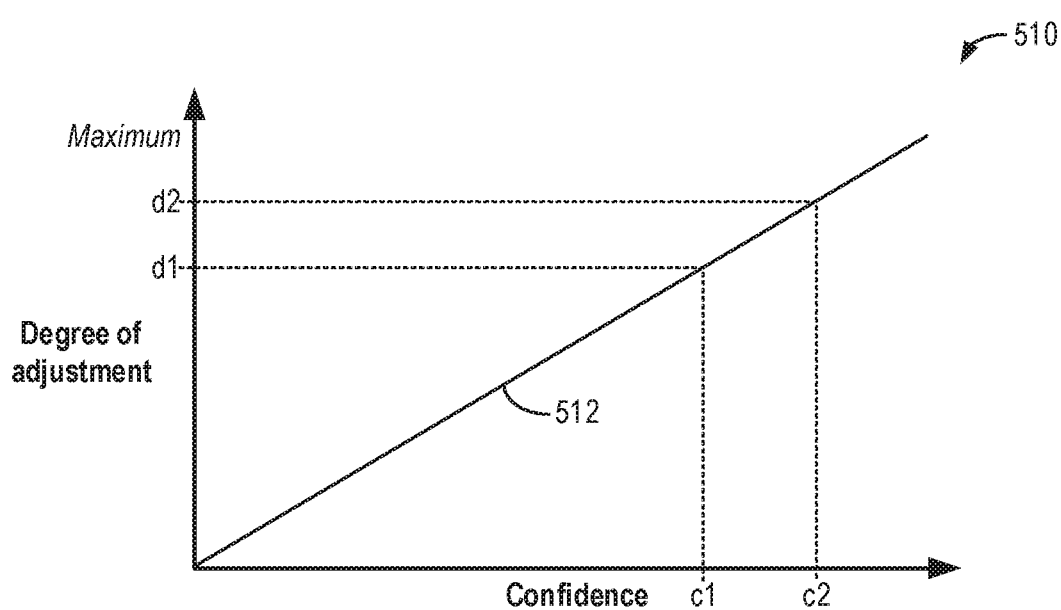
Figure 6:
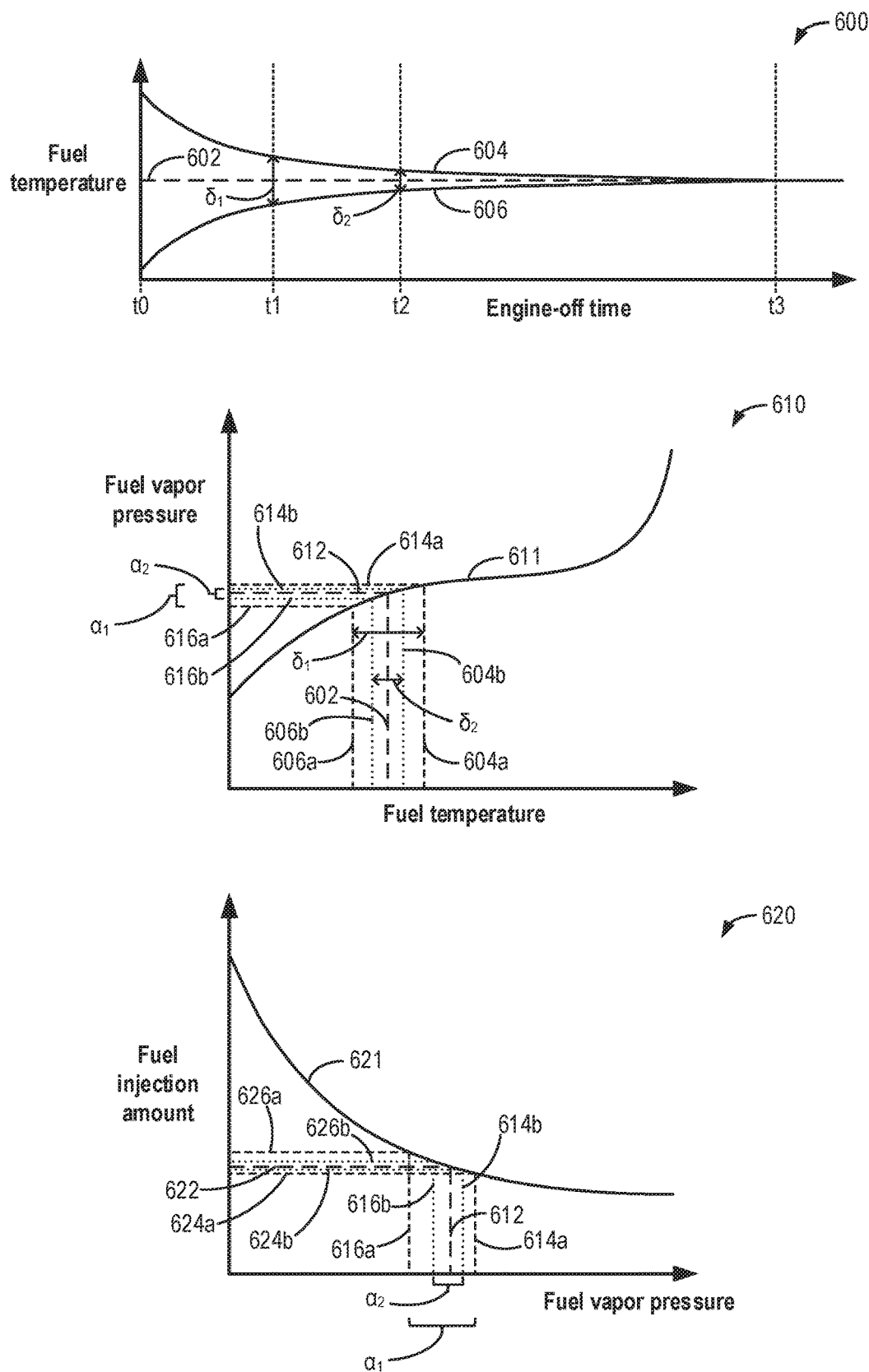
FIG. 6 shows example relationships between an engine-off time, an estimated fuel temperature range, an estimated fuel vapor pressure range, and a fuel injection amount.

The following description relates to systems and methods for reducing engine hesitation and vehicle emissions during an engine cold start. In particular, systems and methods are provided for estimating fuel volatility in a vehicle system, such as the example hybrid electric vehicle system described with respect to FIGS. 1 and 2. The fuel volatility is represented by an estimated fuel vapor pressure, which may be determined using a physics-based model, such as the physics-based model shown in FIG. 4. The estimated fuel vapor pressure may be used to optimize one or more combustion parameters, such as according to the example method of FIG. 3. FIG. 5 graphically illustrates how a combustion parameter may be adjusted to a greater degree when a confidence in the estimated fuel vapor pressure is higher, which varies with an amount of time that the engine has been off prior to the engine cold start. FIG. 6 graphically illustrates how a fuel injection amount may be determined from an estimated fuel temperature range, with the estimated fuel temperature range decreasing as the amount of time that the engine has been off prior to the engine cold start increases.

Figure 1:
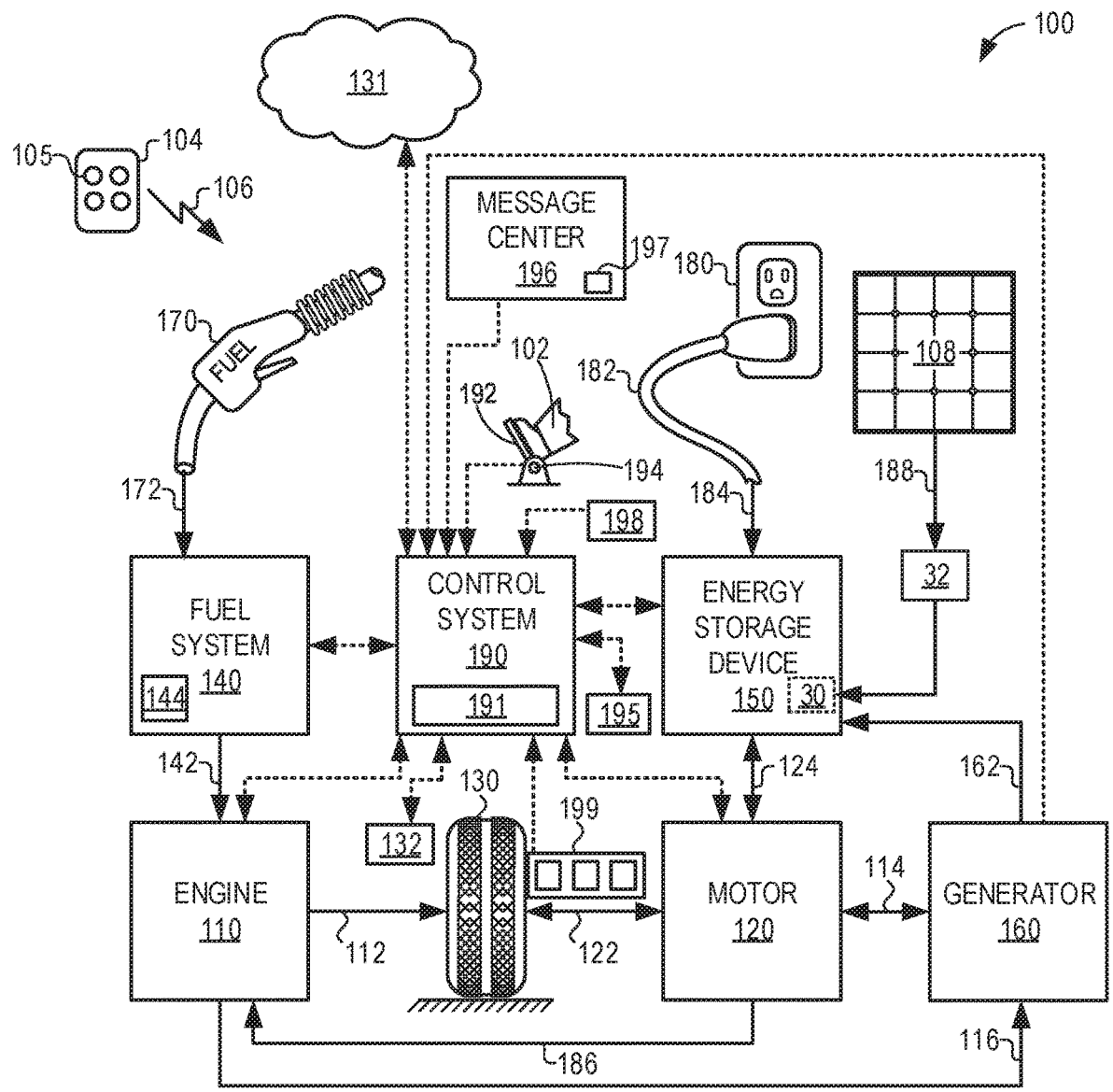
FIG. 1 schematically shows an example vehicle propulsion system.

FIG. 1 illustrates an example vehicle system 100. Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via a drive wheel 130, as indicated by an arrow 122, while engine 110 is deactivated.

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 160 may instead receive wheel torque from drive wheel 130 and may convert the kinetic energy of the vehicle to electrical energy for storage at energy storage device 150, as indicated by an arrow 162. As an additional example, motor 120 may use energy stored at energy storage device 150 to crank engine 110 in a starting operation, as indicated by an arrow 186.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 160, as indicated by an arrow 116, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel tanks 144 for storing fuel on-board the vehicle. For example, fuel tank 144 may store one or more liquid fuels, including (but not limited to) gasoline, diesel, and alcohol fuels. In some examples, the fuel may be stored on-board the vehicle as a blend of two or more different fuels. For example, fuel tank 144 may be configured to store a blend of gasoline and ethanol (such as E10, E85, etc.) or a blend of gasoline and methanol (such as M10, M85, etc.), whereby these fuels or fuel blends may be delivered to engine 110 as indicated by arrow 142. Still other suitable fuels or fuel blends may be supplied to engine 110, where they may be combusted to produce an engine output (e.g., torque). The engine output may be utilized to propel the vehicle (as indicated by arrow 112) or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

A control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback.

Control system 190 may receive an indication of an operator requested output of the vehicle propulsion system from a vehicle operator 102. For example, control system 190 may receive sensory feedback from a pedal position sensor 194 concerning a position of a pedal 192. Pedal 192 may refer schematically to a brake pedal and/or an accelerator pedal that may be depressed by vehicle operator 102. Furthermore, in some examples, control system 190 may be in communication with a remote engine start receiver 195 (or transceiver) that receives wireless signals 106 from a key fob 104 having a remote start button 105. In other examples (not shown), a remote engine start may be initiated via a cellular telephone or a smartphone-based system where a user's telephone sends data to a server and the server communicates with the vehicle to start the engine.

In the case of an autonomous vehicle (AV), operator 102 may be substituted prior to the start of or en route during a specified trip by an autonomous vehicle control system 191 included within control system 190. AV control system 191 may provide indications and/or requested output of vehicle system 100 to control system 190. Control system 190, in accordance with the requests from AV control system 191, then actuates various vehicle actuators to propel the vehicle. In the case of an AV, the vehicle system 100 may include various devices for detecting vehicle surroundings, such as radar, laser light, GPS, odometry, and computer vision sensors. Advanced control systems, as part of the AV control system, may interpret sensory information to identify appropriate navigation paths as well as obstacles and relevant signage (e.g., speed limits, traffic signals, and the like). AV control system 191 may further include executable instructions that are capable of analyzing sensory data to distinguish between different vehicles on the road, which may aid in planning a path to a desired destination, as well as executable instructions to, in combination with sensory feedback, park a vehicle in a designated or detected available parking space. For example, the AV control system may include executable instructions to detect a type of roadway (e.g., a one-way street, a freeway, a divided highway, and the like) or an available parking space (e.g., an empty space with enough clearance for the vehicle that is not prohibited based on time of day or loading zone, and the like).

Energy storage device 150 may periodically receive electrical energy from a power source 180 residing external to the vehicle (e.g., an external stationary power grid that is not part of the vehicle), as indicated by an arrow 184. As a non-limiting example, vehicle system 100 may be configured as a plug-in HEV (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

In still other examples, vehicle system 100 may include one or more solar cells 108, operative to convert incident solar radiation into electrical energy. The solar cells 108 are electrically coupled to a solar battery 30 via a charge controller 32. Solar cells 108 and charge controller 32 are operative to supply electrical current for charging solar battery 30. In this example, solar battery 30 is housed within and electrically coupled to energy storage device 150, but in other configurations, solar battery 30 may be electrically coupled to energy storage device 150 while being housed separately. In still other configurations, solar battery 30 may be both physically and electrically isolated from energy storage device 150. Solar battery 30 may thus be configured to provide or receive charge from energy storage device 150, depending on engine operating conditions, charge status, and battery requirement(s). In some examples, solar battery 30 may be configured to independently supply charge directly to vehicle actuators and devices. Additionally, in some examples, charge controller 32 may be used to directly supply power to vehicle actuators and devices without requiring charge to first be stored in solar battery 30.

Solar cells 108 may be mounted on any convenient exterior surface of the vehicle, for example, a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some examples, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 32 and solar battery 30. In this way, solar cells 108 may generate electrical energy with which to propel the vehicle or power one or more additional vehicle actuators and devices.

Fuel system 140 may periodically receive fuel from a fuel source residing external to the vehicle. As a non-limiting example, vehicle system 100 may be refueled by receiving fuel via a fuel dispensing device 170, as indicated by an arrow 172. In some examples, fuel tank 144 may be configured to store the fuel received from fuel dispensing device 170 until it is supplied to engine 110 for combustion. In some examples, control system 190 may receive an indication of a level of fuel stored in fuel tank 144 via a fuel level sensor. The level of fuel stored in fuel tank 144 (e.g., as identified by the fuel level sensor) may be communicated to the vehicle operator, for example, via a fuel gauge or indication in a vehicle instrument panel (e.g., message center) 196.

The vehicle system 100 may also include an ambient temperature sensor 198 and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input devices for receiving an operator input, such as buttons, touch screens, voice input/recognition, etc. For example, the vehicle instrument panel 196 may include a refueling button 197, which may be manually actuated or pressed by a vehicle operator to initiate refueling.

Control system 190 may be communicatively coupled to other vehicles or infrastructures using appropriate communications technology. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g., WiMax) may be used in place of or in conjunction with V2V or V2I2V to extend the coverage area by a few miles. In still other examples, vehicle control system 190 may be communicatively coupled to other vehicles or infrastructures via wireless network 131 and the Internet (e.g., the Cloud).

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be additionally used to infer engine operating parameters, such as local barometric pressure. As discussed above, control system 190 may further be configured to receive information via the Internet or other communication networks. Information received from the GPS may be cross-referenced to information available via the Internet to determine local weather conditions, local vehicle regulations, etc.

Figure 2:
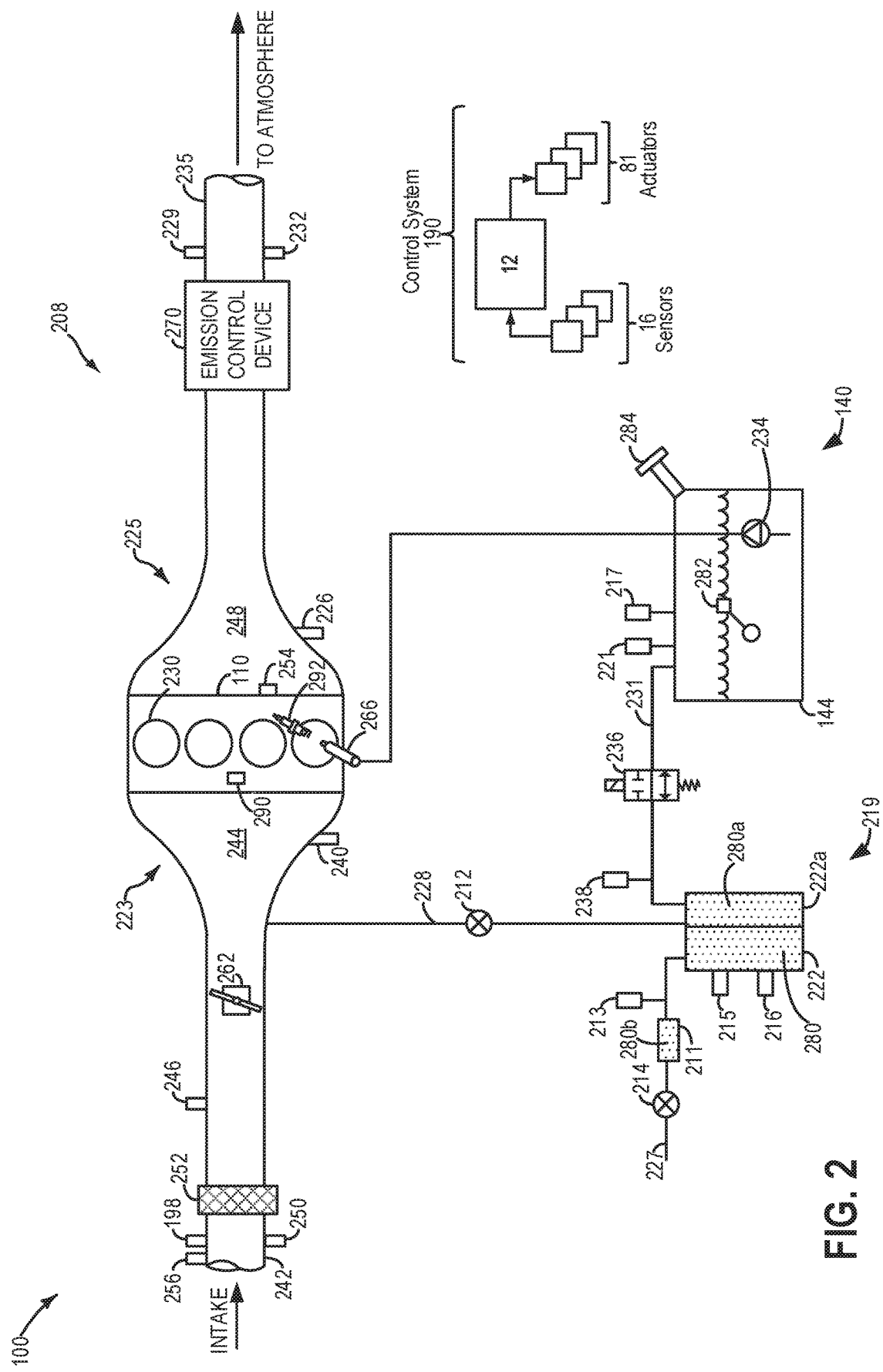
FIG. 2 shows a schematic depiction of a fuel system and evaporative emission system coupled to an engine system.

FIG. 2 shows a schematic depiction of an engine system 208 that may be included in vehicle system 100. As such, like components previously introduced in FIG. 1 are numbered the same and may not be reintroduced. Engine system 208 is shown including engine 110 having a plurality of cylinders 230. Engine 110 may include an engine intake system 223 and an engine exhaust system 225. Engine intake system 223 may include an air intake throttle 262 fluidly coupled to an intake manifold 244 via an intake passage 242. Air may be routed to intake throttle 262 after passing through an air filter 252 coupled to intake passage 242 upstream of intake throttle 262. Engine exhaust system 225 includes an exhaust manifold 248 leading to an exhaust passage 235 that routes exhaust gas to the atmosphere. Engine exhaust system 225 may include one or more emission control devices 270 mounted in a close-coupled position. The one or more emission control devices may include a three-way catalyst, a lean NOx trap, a particulate filter (e.g., a diesel particulate filter or a gasoline particulate filter), an oxidation catalyst, etc. It will be appreciated that other components may be included in the engine, such as a variety of valves and sensors, as further elaborated in herein. In some embodiments, wherein engine system 208 is a boosted engine system, the engine system may further include a boosting device, such as a turbocharger (not shown).

A knock sensor 290 may be coupled to various locations in engine 110, including the engine block. The output of knock sensor 290 may be used to indicate an abnormal combustion event in cylinder 230 and the rest of the cylinders included in engine 110. In one example, based on the output of knock sensor 290 in one or more defined windows (e.g., crank angle timing windows), abnormal combustion due to one or more of knock and pre-ignition may be identified and differentiated. For example, knock may be identified responsive to knock sensor output obtained in a knock window being higher than a knock threshold, while pre-ignition may be identified responsive to knock sensor output obtained in a pre-ignition window being higher than a pre-ignition threshold. The pre-ignition threshold may be higher than the knock threshold, and the pre-ignition window may be earlier than the knock window, for example. In some examples, the knock sensor output may be combined with the output of a crankshaft acceleration sensor to identify one or more of knock and pre-ignition.

Each cylinder of engine 110 may include a spark plug 292 for initiating combustion. An ignition system may provide an ignition spark to cylinder 230 via spark plug 292 in response to a spark advance signal SA from a controller 12 included in control system 190, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and an exhaust gas air-fuel ratio (AFR), into a look-up table and output the corresponding MBT timing for the input engine operating conditions. In other examples, spark may be retarded from MBT, such as to expedite catalyst warm-up during engine start or to reduce an occurrence of engine knock.

Engine system 208 is shown coupled to fuel system 140 and an evaporative emissions system 219. Fuel system 140 includes fuel tank 144 coupled to a fuel pump 234, the fuel tank supplying a fuel to engine 110 that propels vehicle system 100. Evaporative emissions system 219 includes a fuel vapor storage canister 222. During a fuel tank refueling event, fuel may be pumped into fuel tank 144 from an external source through a refueling port 284. Fuel tank 144 may hold a plurality of fuel blends, including fuel with a range of alcohol concentrations, such as various gasoline-ethanol blends, including E10, E85, gasoline, etc., and combinations thereof. A fuel level sensor 282 located in fuel tank 144 may provide an indication of a fuel level ("Fuel Level Input") to controller 12. As depicted, fuel level sensor 282 may comprise a float connected to a variable resistor. Alternatively, other types of fuel level sensors may be used.

Fuel pump 234 is configured to deliver pressurized fuel to fuel injectors of engine 110, such as an example fuel injector 266. While only a single fuel injector 266 is shown, additional fuel injectors may be provided for each cylinder. In the example of FIG. 2, fuel injector 266 is shown coupled directly to one cylinder 230 for injecting fuel directly therein. The amount of fuel injected may be in proportion to a pulse width of a signal FPW received from controller 12 via an electronic driver, for example. In this manner, fuel injector 266 provides what is known as direct injection (hereafter also referred to as "DI") of fuel into cylinder 230. In an alternate example, fuel injector 266 may be arranged in an intake passage rather than coupled directly to cylinder 230 in a configuration that provides what is known as port injection of fuel (hereafter also referred to as "PFI") into an intake port upstream of cylinder 230. In yet other examples, cylinder 230 may include multiple injectors, which may be configured as direct fuel injectors, port fuel injectors, or a combination thereof. As such, it should be appreciated that the fuel systems described herein should not be limited by the particular fuel injector configurations described herein and shown in FIG. 2 by way of example.

It will be appreciated that fuel system 140 may be a return-less fuel system, a return fuel system, or various other types of fuel system. Vapors generated in fuel tank 144 may be routed to fuel vapor storage canister 222 via a conduit 231 for storage before being purged to the engine intake system 223. Fuel vapor storage canister 222 is filled with an appropriate adsorbent 280 for temporarily trapping fuel vapors (including vaporized hydrocarbons) generated during fuel tank refueling operations, diurnal vapors, and running-loss vapors. In one example, adsorbent 280 is activated charcoal (e.g., carbon). While a single fuel vapor storage canister 222 is shown, it will be appreciated that fuel system 140 and evaporative emissions system 219 may include any number of fuel vapor storage canisters. When purging conditions are met, such as when the fuel vapor storage canister is saturated, vapors stored in fuel vapor storage canister 222 may be purged to engine intake system 223 by opening a canister purge valve (CPV) 212, which may be a normally closed valve, in a purge line 228. In one example, canister purge valve 212 may be a solenoid valve wherein opening or closing of the valve is performed via actuation of a canister purge solenoid.

Fuel vapor storage canister 222 may include a buffer 222a (or buffer region), each of the fuel vapor storage canister and the buffer comprising adsorbent. For example, buffer 222a is shown packed with an adsorbent 280a. As shown, the volume of buffer 222a may be smaller than (e.g., a fraction of) the volume of fuel vapor storage canister 222. Adsorbent 280a in the buffer 222a may be same as or different from adsorbent 280 in the fuel vapor storage canister (e.g., both may include charcoal). Buffer 222a may be positioned within fuel vapor storage canister 222 such that during fuel vapor storage canister loading, fuel tank vapors are first adsorbed within the buffer, and then when the buffer is saturated, further fuel tank vapors are adsorbed in the fuel vapor storage canister. In comparison, during fuel vapor storage canister purging, fuel vapors are first desorbed from the fuel vapor storage canister (e.g., to a threshold amount) before being desorbed from the buffer. In other words, loading and unloading of the buffer is not linear with the loading and unloading of the fuel vapor storage canister. As such, the effect of the fuel vapor storage canister buffer is to dampen any fuel vapor spikes flowing from the fuel tank to the fuel vapor storage canister, thereby reducing the possibility of any fuel vapor spikes going to the engine.

Fuel vapor storage canister 222 includes a vent 227 for routing gases out of the fuel vapor storage canister 222 to the atmosphere when storing fuel vapors from fuel tank 144. Vent 227 may also allow fresh air to be drawn into fuel vapor storage canister 222 when purging stored fuel vapors to engine intake 223 via purge line 228 and canister purge valve 212. While this example shows vent 227 communicating with fresh, unheated air, various modifications may also be used. Vent 227 may include a canister vent valve (CVV) 214 to adjust a flow of air and vapors between fuel vapor storage canister 222 and the atmosphere. When included, the vent valve may be a normally open valve so that air, stripped of fuel vapor after having passed through the fuel vapor storage canister, can be pushed out to the atmosphere (for example, during refueling while the engine is off). Likewise, during purging operations (for example, during fuel vapor storage canister regeneration and while the engine is running), the fuel vapor storage canister vent valve may be opened to allow a flow of fresh air to strip the fuel vapors stored in the fuel vapor storage canister. In one example, canister vent valve 214 may be a solenoid valve wherein opening or closing of the valve is performed via actuation of a canister vent solenoid. In particular, the canister vent valve may be in an open position that is closed upon actuation of the canister vent solenoid.

Evaporative emissions system 219 may further include a bleed fuel vapor storage canister 211. Hydrocarbons that desorb from fuel vapor storage canister 222 (hereinafter also referred to as the "main fuel vapor storage canister") may be adsorbed within the bleed fuel vapor storage canister. Bleed fuel vapor storage canister 211 may include an adsorbent 280b that is different than adsorbent 280 included in main fuel vapor storage canister 222. Alternatively, the adsorbent material in bleed fuel vapor storage canister 211 may be the same as that included in main fuel vapor storage canister 222.

A hydrocarbon (HC) sensor 213 may be present in evaporative emissions system 219 to indicate a concentration of hydrocarbons in vent 227. As illustrated, hydrocarbon sensor 213 is positioned between main fuel vapor storage canister 222 and bleed fuel vapor storage canister 211. A probe (e.g., sensing element) of hydrocarbon sensor 213 is exposed to and senses the hydrocarbon concentration of fluid flow in vent 227. Hydrocarbon sensor 213 may be used by control system 190 for determining a breakthrough of hydrocarbon vapors from main fuel vapor storage canister 222, in one example.

One or more temperature sensors 215 may be coupled to and/or within fuel vapor storage canister 222. As fuel vapor is adsorbed by the adsorbent in the fuel vapor storage canister, heat is generated (heat of adsorption). Likewise, as fuel vapor is desorbed by the adsorbent in the fuel vapor storage canister, heat is consumed. In this way, the adsorption and desorption of fuel vapor by the fuel vapor storage canister may be monitored and estimated based on temperature changes within the fuel vapor storage canister. Further, one or more canister heating elements 216 may be coupled to and/or within fuel vapor storage canister 222. Canister heating element 216 may be used to selectively heat the fuel vapor storage canister (and the adsorbent contained within), for example, to increase desorption of fuel vapors prior to performing a purge operation. Canister heating element 216 may comprise an electric heating element, such as a conductive metal, ceramic, or carbon element that may be heated electrically. In some examples, canister heating element 216 may comprise a source of microwave energy or may comprise a fuel vapor storage canister jacket coupled to a source of hot air or hot water. Canister heating element 216 may be coupled to one or more heat exchangers that may facilitate the transfer of heat, (e.g., from hot exhaust) to fuel vapor storage canister 222. Canister heating element 216 may be configured to heat air within fuel vapor storage canister 222 and/or to directly heat the adsorbent located within fuel vapor storage canister 222. In some embodiments, canister heating element 216 may be included in a heater compartment coupled to the interior or exterior of fuel vapor storage canister 222. In some embodiments, fuel vapor storage canister 222 may be coupled to one or more cooling circuits and/or cooling fans. In this way, fuel vapor storage canister 222 may be selectively cooled to increase adsorption of fuel vapors (e.g., prior to a refueling event). In some examples, canister heating element 216 may comprise one or more Peltier elements, which may be configured to selectively heat or cool fuel vapor storage canister 222.

Vehicle system 100 may have reduced engine operation times due to the vehicle being powered by engine system 208 during some conditions and by the energy storage device under other conditions (such as described with respect to FIG. 1) or due to the engine shutting down when the vehicle is on and at rest (such as when vehicle system 100 is included in a stop/start vehicle). While the reduced engine operation times reduce overall carbon emissions from the vehicle, they may also lead to insufficient purging of fuel vapors from evaporative emission system 219. To at least partially address this, a fuel tank isolation valve (FTIV) 236 may be optionally included in conduit 231 such that fuel tank 144 is coupled to fuel vapor storage canister 222 via the valve. In some examples, FTIV 236 may be a solenoid valve wherein opening or closing of the valve is performed via actuation of a canister vent solenoid. In particular, the FTIV may be in an open position that is closed upon actuation of the canister vent solenoid. For example, while the engine is off, FTIV 236 may be open so that fuel tank 144 is vented to the atmosphere through evaporative emissions system 219 (e.g., via vent 227 and open CVV 214). In another example, while the engine is on and combusting fuel, FTIV 236 may be kept closed to limit an amount of diurnal or "running loss" vapors directed to fuel vapor storage canister 222 from fuel tank 144. During selected purging conditions, FTIV 236 may be temporarily opened, e.g., for a duration, to direct fuel vapors from fuel tank 144 to fuel vapor storage canister 222. While the depicted example shows FTIV 236 positioned along conduit 231, in alternate embodiments, FTIV 236 may be mounted on fuel tank 144.

In some examples, one or more pressure sensors may be coupled to fuel system 140 and evaporative emissions system 219 for providing an estimate of a fuel system and an evaporative emissions system pressure, respectively. In the example illustrated in FIG. 2, a first pressure sensor 217 is coupled directly to fuel tank 144, and a second pressure sensor 238 is coupled to conduit 231 between FTIV 236 and fuel vapor storage canister 222. For example, first pressure sensor 217 may be a fuel tank pressure transducer (FTPT) coupled to fuel tank 144 for measuring a pressure of fuel tank 144, and second pressure sensor 238 may measure a pressure of evaporative emissions system 219. In alternative examples, first pressure sensor 217 may be coupled between fuel tank 144 and fuel vapor storage canister 222, specifically between the fuel tank and FTIV 236. In other examples, a single pressure sensor may be included for measuring both the fuel system pressure and the evaporative system pressure, such as when FTIV 236 is open or omitted. In still other examples, both first pressure sensor 217 and second pressure sensor 238 may be omitted, and the fuel tank pressure may be estimated based on ambient pressure, as further described herein.

In some examples, one or more temperature sensors 221 may also be coupled to fuel system 140 for providing an estimate of a fuel system temperature. In one example, the fuel system temperature is a fuel tank temperature, wherein temperature sensor 221 is a fuel tank temperature sensor coupled to fuel tank 144. While the depicted example shows temperature sensor 221 directly coupled to fuel tank 144, in alternate examples, the temperature sensor may be coupled between the fuel tank and fuel vapor storage canister 222. In still other examples, temperature sensor 221 may be omitted, and the fuel tank temperature may be estimated based on ambient temperature, as further described herein.

Control system 190 is shown receiving information from a plurality of sensors 16 (various examples of which are described herein) and sending control signals to a plurality of actuators 81 (various examples of which are described herein). As one example, sensors 16 may include an exhaust gas sensor 226 located upstream of emission control device 270, an exhaust temperature sensor 232 coupled to exhaust passage 235, a manifold absolute pressure (MAP) sensor 240, a mass airflow (MAF) sensor 246 coupled to the intake passage, an ambient pressure sensor 250 coupled to intake passage 242, an ambient humidity sensor 256 coupled to intake passage 242, ambient temperature sensor 198 coupled to the intake passage, an engine coolant temperature sensor 254 coupled to a cooling sleeve of the engine, knock sensor 290, FTPT 217, second pressure sensor 238, hydrocarbon sensor 213, temperature sensor 221, and an exhaust pressure sensor 229 located downstream of emission control device 270. Other sensors, such as additional pressure, temperature, air/fuel ratio, and composition sensors, may be coupled to various locations in the vehicle system 100. As another example, actuators 81 may include fuel injector 266, FTIV 236, CPV 212, CVV 214, fuel pump 234, spark plug 292, and throttle 262.

As described above with reference to FIG. 1, control system 190 may further receive information regarding the location of the vehicle from an on-board GPS. Information received from the GPS may include vehicle speed, vehicle altitude, vehicle position, etc. This information may be used to infer engine operating parameters, such as local barometric pressure. Control system 190 may further be configured to receive information via the Internet or other communication networks. Information received from the GPS may be cross-referenced to information available via the Internet to determine local weather conditions, local vehicle regulations, etc. Control system 190 may also use the Internet to obtain updated software modules, which may be stored in non-transitory memory.

Controller 12 of control system 190 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may receive input data from the various sensors, process the input data, and trigger the actuators in response to the processed input data based on instruction or code programmed therein corresponding to one or more routines, such as the example routine described with respect to FIG. 3.

In some examples, the controller may be placed in a reduced power mode or sleep mode, wherein the controller maintains essential functions only and operates with a lower battery consumption than in a corresponding awake mode. For example, the controller may be placed in the sleep mode following a vehicle-off event (e.g., a human driver removing a key from a vehicle and/or leaving the proximity of the vehicle with a key fob, at which time the engine may be stopped rotating and electrical propulsion devices, if present, may be deactivated). The controller may have a wake input that allows the controller to be returned to the awake mode based on an input received from one or more sensors. For example, the opening of a vehicle door may trigger a return to an awake mode prior to a vehicle key event (e.g., a key-on event, wherein an ignition of the vehicle is switched to an "on" position). As another example, unlocking the vehicle via key fob 104 (shown in FIG. 1) may trigger a return to an awake mode. As such, controller 12 is powered "on" prior to an engine start request.

Figure 3:
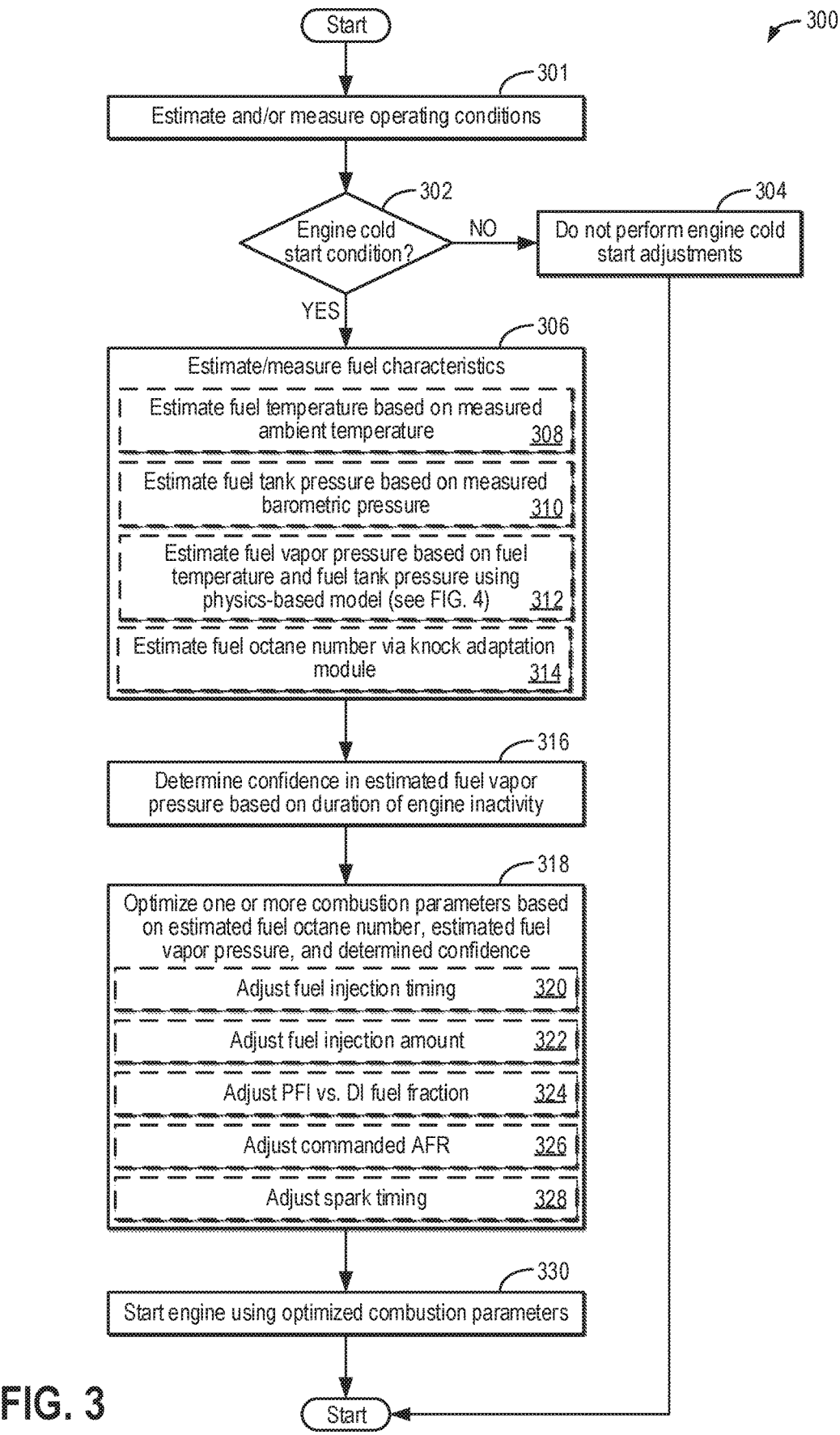
FIG. 3 is a flow chart of an example method for estimating fuel characteristics during an engine cold start and optimizing one or more combustion parameters based on the estimated fuel characteristics.

Next, FIG. 3 shows an example method 300 for adjusting one or more combustion parameters during an engine cold start based on estimated fuel characteristics. For example, the fuel may be stored in a fuel tank of a fuel system (e.g., fuel tank 144 of FIGS. 1 and 2). As the fuel ages (e.g., a duration that the fuel has been stored in the fuel tank increases), the volatility of the fuel may decrease, leading to engine hesitation during the cold start and increased vehicle emissions. For example, the duration that the fuel has been stored in the fuel tank may be relatively long (e.g., months to years) when the engine is included in a HEV system, such as vehicle system 100 shown in FIGS. 1 and 2. Further, when the vehicle is an AV, refueling may be less controlled than when the vehicle is non-autonomous (e.g., operated by a human). For example, the frequency of refueling and the location of the refueling may differ when the vehicle is an AV versus a non-autonomous vehicle. For both AVs and non-AVs, the refueling frequency and location may affect the fuel composition, which may vary by region and season, with various additives added to fuel blends to alter fuel volatility. For example, fuels sold in areas with a warm climate may have a lower volatility than fuels sold in areas with a cold climate so that the difference in climate corresponds to a difference in fuel volatility. Similarly, the fuel volatility may vary throughout the year in a same region based on the climate of the region. For example, fuel dispensed at fuel pump may have a lower fuel volatility during warmer months than fuel dispensed during colder months. Furthermore, commercial fuel distributors may offer fuels comprising a blend of gasoline and ethanol (e.g., E10, E25, E85, etc.) to reduce carbon emissions. Further still, a fuel tank may be refueled with fuel of a particular composition while the fuel tank still contains some amount of fuel, possibly of a different composition. As a result, a typical fuel tank may contain a plurality of different fuel blends, which may be further affected by the fuel age. In particular, as the fuel ages, a fraction of higher volatility light ends may decrease as the light ends evaporate, leaving behind a higher fraction of lower volatility heavy ends (e.g., hesitation fuel). Therefore, a controller (e.g., controller 12 of FIGS. 1 and 2) may estimate the fuel volatility and adjust the combustion parameters accordingly to decrease engine hesitation and vehicle emissions during the cold start, as described below. Instructions for carrying out method 300 and the rest of the methods included herein may be executed by the controller based on instructions stored on a memory of the controller and in conjunction with signals received from sensors of the engine system, such as the sensors described above with reference to FIGS. 1 and 2 (e.g., ambient temperature sensor 198 of FIGS. 1 and 2, ambient humidity sensor 256 of FIG. 2, and ambient pressure sensor 250 of FIG. 2). The controller may employ engine actuators of the engine system (e.g., fuel injector 266 shown in FIG. 2) to adjust engine operation according to the methods described below.

Method 300 begins at 301 and includes estimating and/or measuring operating conditions. Operating conditions may include, but are not limited to, a mode of vehicle operation (such as an electric mode, in which the vehicle is propelled with torque from an electric motor, or an engine mode, in which the vehicle is propelled at least partially with torque from the engine), driver-demanded torque, engine speed and load, engine temperature, ambient temperature, ambient (e.g., barometric) pressure, and ambient humidity. Operating conditions may be measured by one or more sensors communicatively coupled to a controller or may be inferred based on available data. As an example, the engine temperature may be estimated from an engine coolant temperature measured by an engine coolant temperature sensor. Ambient conditions (e.g., ambient humidity, temperature, and pressure) may be measured by corresponding sensors, as further described below, or may be inferred based on information downloaded from the Internet and/or a GPS, such as local weather conditions.

At 302, method 300 includes determining if an engine cold start condition is present. The cold start condition may be confirmed when the engine is started (e.g., cranked from zero speed to a non-zero speed, with fuel and spark provided to initiate combustion) responsive to an engine start request after a prolonged period of engine inactivity, such as when the engine has been inactive for greater than a first threshold duration. The first threshold duration may refer to an amount of time over which the engine is expected to cool to the ambient temperature, for example. In one example, the first threshold duration may be a fixed time duration. In another example, the first threshold duration may be adjusted based on one or more of the engine temperature and the ambient temperature at the prior engine shutdown. Additionally or alternatively, the cold start condition may be confirmed when the engine temperature is lower than a threshold temperature (such as below a light-off temperature of an emission control device) at engine start. As another example, the cold start condition may be confirmed when the engine temperature is substantially equal to the ambient temperature (e.g., within a threshold of the ambient temperature, such as within 10 degrees of the ambient temperature) at engine start. The engine start may be requested by a vehicle operator, such as via a vehicle key-on event, or by the controller (e.g., based on the torque demand).

If an engine cold start condition is not present, method 300 proceeds to 304 and includes not performing engine cold start adjustments. For example, if an engine start is not requested, the engine may continue to be operated according to the current operating conditions when the engine is already on, or the engine may remain off (e.g., at rest, without combustion occurring in the engine cylinders). As another example, if an engine start is requested by the engine is not cold (e.g., a hot start condition is present), the engine may be started according to a nominal start up procedure for the given operating conditions. Following 304, method 300 ends.

If an engine cold start condition is present at 302, method 300 proceeds to 306 and includes estimating and/or measuring fuel characteristics. The fuel characteristics may include one or more of a fuel temperature, a fuel tank pressure, a fuel vapor pressure, and a fuel octane number. The fuel characteristics may further include a fuel type, such as a fuel blend. The fuel characteristics may be estimated (e.g., based on operating conditions), measured (e.g., via sensors), or inferred based on available data, as further described below. As an example, the fuel type may be determined following a fuel tank refilling event based on a concentration of oxygen in the exhaust gas measured by of an exhaust gas oxygen sensor (e.g., exhaust gas sensor 226 shown in FIG. 2) and a pulse width of a control signal sent to fuel injectors of the engine. The controller may input the concentration and the pulse width into a look-up table and output the fuel type, for example. Alternatively, the fuel type may be determined directly using a flex fuel ethanol sensor.

Estimating and/or measuring the fuel characteristics may include estimating a fuel temperature based on the measured ambient temperature, as indicated at 308. For example, during the cold start, when the engine has cooled to at or around ambient temperature, it may be assumed that the fuel has also cooled to at or around ambient temperature, as elaborated below. Therefore, the measured ambient temperature value may be used as the estimated fuel temperature value. Alternatively, the fuel temperature may be estimated based on the fuel tank temperature, such as measured via a fuel tank temperature sensor (e.g., temperature sensor 221 of FIG. 2), when included in the fuel system.

Estimating and/or measuring the fuel characteristics may include estimating the fuel tank pressure based on the measured barometric pressure, as indicated at 310. For example, the fuel tank pressure may be estimated based on the measured barometric pressure when the fuel tank is vented to atmosphere, such as via an open FTIV (e.g., FTIV 236 of FIG. 2) and an evaporative emissions system coupled to the atmosphere (e.g., evaporative emissions system 219 of FIG. 2). With the fuel tank coupled to the atmosphere via the evaporative emissions system, the measured barometric pressure value may be used as the estimated fuel tank pressure value. Alternatively, the fuel tank pressure may be directly measured, such as via a pressure sensor coupled to the fuel tank (e.g., first pressure sensor 217 of FIG. 2), when included in the fuel system.

Estimating and/or measuring the fuel characteristics may further include estimating the fuel vapor pressure based on the estimated fuel temperature and the estimated fuel tank pressure using a physics-based model, as indicated at 312.

Figure 4:
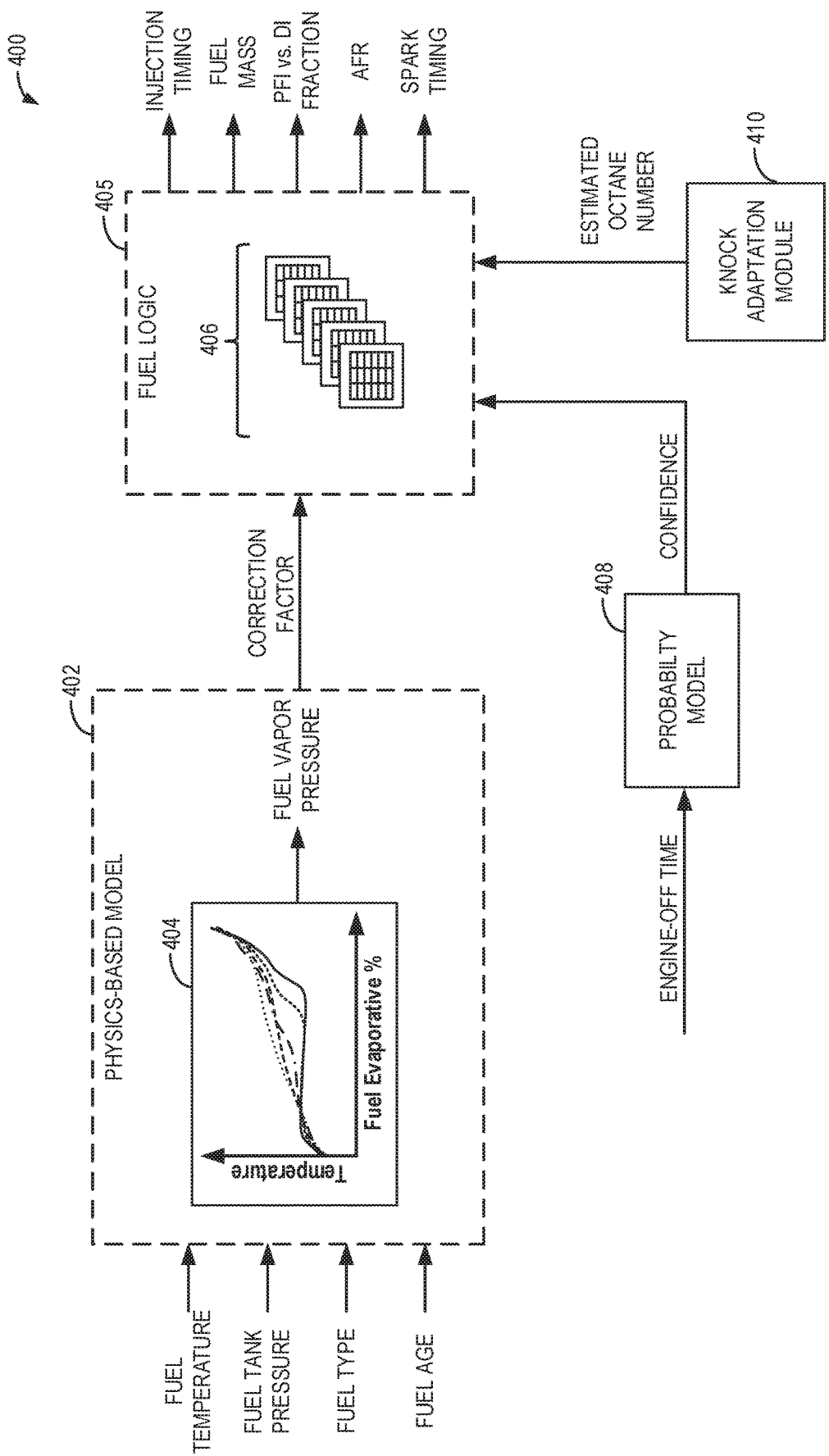
FIG. 4 illustrates a block diagram of a physics-based model that may be used to optimize one or more combustion parameters based on fuel volatility during an engine cold start.

For example, the physics-based model may utilize a fuel distillation curve stored in a memory of the controller, as will be further described with respect to FIG. 4. The fuel vapor pressure is directly related to the fuel volatility; as the fuel vapor pressure increases, the fuel volatility increases. Therefore, the fuel vapor pressure may be used as a measure of the fuel volatility.

Estimating and/or measuring the fuel characteristics may further include estimating the fuel octane number via a knock adaptation module, as indicated at 314. For example, the controller may retrieve the most recent fuel octane number estimate, which may be stored in a memory of the controller. The most recent fuel octane number may have been determined during a previous engine operation, wherein the controller may estimate the fuel octane number using the knock adaptation module, for example. The knock adaptation module may adjust a fuel octane number (e.g., as determined from the fuel type) with a global correction factor, which may in turn adjust a borderline spark value for increased engine torque output. The global correction factor may be learned by the knock adaptation module based on knock detection (such as using a knock sensor), by integrating fast-loop spark knock correction values over a knock window. Additionally or alternatively, the fuel octane number may be estimated based on the fuel type and the ambient humidity. For example, the controller may input the fuel type and the ambient humidity into a look-up table and output the estimated fuel octane number.

At 316, method 300 includes determining a confidence in the estimated fuel vapor pressure based on a duration of engine inactivity. The duration of engine inactivity may refer to an amount of time that has elapsed since the engine was last operated (e.g., since combustion last occurred in the engine). As an example, the duration of engine inactivity may be compared to a second threshold duration. The second threshold duration may refer to an amount of time over which the fuel in the fuel tank is expected to cool to the ambient temperature, for example. The second threshold duration may be the same as or different than the first threshold duration. In one example, the second threshold duration may be a fixed time duration. In another example, the second threshold duration may be adjusted based on one or more of an engine run time (e.g., an amount of time that the engine is operated) prior to the previous (e.g., most recent) engine shutdown, a fuel level (e.g., as determined by a fuel level sensor, such as fuel level sensor 282 of FIG. 2), the ambient temperature at the previous engine shutdown, the current engine temperature, and the current ambient temperature. The controller may compare the duration of engine inactivity with the second threshold duration to determine the confidence using a probability model, for example, such as a Gaussian probability distribution. For example, as the duration of engine inactivity increases beyond the second threshold duration, the confidence that the estimated fuel temperature is accurate increases until a maximum confidence is reached, and, as the duration of engine inactivity decreases below the second threshold, the confidence that the estimated fuel temperature is accurate decreases. Although the fuel tank pressure may also deviate from barometric pressure, with the fuel tank vented to atmosphere, it may take a relatively short amount of time for the fuel tank pressure to equilibrate with barometric pressure, such as less than an amount of time for the engine to achieve the cold start condition (e.g., less than the first threshold duration described at 302). Therefore, discrepancies in the fuel temperature from the ambient temperature may be assumed to be the primary source of potential inaccuracy in the fuel vapor pressure estimation.

As an alternative example, the controller may use an algorithm to determine an expected amount of time for the fuel temperature to reach the ambient temperature, and may then compare the duration of engine inactivity to the expected amount of time. For example, the algorithm may use a temperature decay function, such as an exponential decay function, to determine an expected amount of time for the fuel temperature to reach the ambient temperature. The exponential decay function may utilize a time constant determined from an empirical fuel cooling curve. The time constant may be stored in a memory of the controller (e.g., in a look-up table, with the ambient temperature at the previous engine shutdown as the input). Further, the exponential decay function may be multiplied by a fuel level normalizer to account for an influence of the fuel level on a cooling rate of the fuel, as more fuel (e.g., a higher fuel level) cools more slowly than less fuel (e.g., a lower fuel level). In some examples, the expected amount of time may be determined at the previous engine shutdown and stored in a memory of the controller for use at the subsequent engine start. The controller may compare the duration of engine inactivity with the expected amount of time to determine the confidence, for example, using the probability model. For example, as the duration of engine inactivity increases beyond the expected amount of time, the confidence that the estimated fuel temperature is accurate increases until the maximum confidence is reached, and, as the duration of engine inactivity decreases below expected amount of time, the confidence that the estimated fuel temperature is accurate decreases.

As another alternative example, the controller may refer a model that uses the temperature decay function, the duration of engine inactivity, and the ambient temperature to determine an estimated fuel temperature range, as will be described with respect to FIG. 5. For example, it may be assumed that the actual fuel temperature is within the estimated fuel temperature range with high (e.g., 95%) confidence. The estimated fuel temperature range may be used by the physics-based model to determine an estimated fuel vapor pressure range. It may be assumed that the actual fuel vapor pressure is within the estimated fuel vapor pressure range with high confidence, for example. As the duration of engine inactivity decreases, the estimated fuel temperature range may increase, and the resulting estimated fuel vapor pressure range may increase.

As another example, the confidence may be determined based on logic rules that are a function of the duration of engine inactivity without comparing the duration of engine inactivity to the second threshold duration or the expected amount of time for the fuel temperature to reach the ambient temperature. As still another example, when the fuel tank pressure sensor and the fuel temperature sensor are included in the fuel system, it may be determined that the estimated fuel vapor pressure is accurate with high (e.g., maximum) confidence without comparing the duration of engine inactivity to either the second threshold duration or the expected amount of time for the fuel temperature to reach the ambient temperature.

At 318, method 300 includes optimizing one or more combustion parameters based on the estimated fuel octane number, the estimated fuel vapor pressure (e.g., volatility), and the determined confidence. For example, as further illustrated with respect to FIG. 4, the controller may input one or more of the estimated fuel octane number, the estimated fuel vapor pressure (and/or a correction factor determined directly from the estimated fuel vapor pressure), and the determined confidence into a plurality of look-up tables, algorithms, and/or maps and output the one or more combustion parameters, which are optimized for the input fuel characteristics to reduce engine hesitation during the cold start. Further, by optimizing the one or more combustion parameters based on the determined confidence, more aggressive adjustments may be made when the determined confidence is higher, and more conservative adjustments may be made when the determined confidence is lower, as will be described with respect to FIG. 5. Alternatively, when the estimated fuel vapor pressure range is used, the most conservative combustion parameter adjustment may be made for the given range, as will be further illustrated with respect to FIG. 6. By incorporating the confidence, over-adjustments and under-adjustments may be minimized.

Optimizing the one or more combustion parameters may include adjusting a fuel injection timing, as indicated at 320. For example, as the fuel vapor pressure decreases (e.g., as the fuel age increases), the fuel injection timing (e.g., a start of injection) may be advanced. Furthermore, as the determined confidence increases, the degree to which the fuel injection timing is advanced from a previous fuel injection timing setting for the given fuel type may be increased. For example, the previous fuel injection timing setting may be a nominal, pre-calibrated value for an engine cold start or may be a previously updated value stored in a memory of the controller, such as the adjusted fuel injection timing determined during the previous engine cold start (e.g., determined according to method 300 during a previous execution).

Optimizing the one or more combustion parameters may include adjusting a fuel injection amount, as indicated at 322. For example, as the fuel vapor pressure decreases, the fuel injection amount may be increased. Furthermore, as the determined confidence increases, the degree to which the fuel injection amount is adjusted from a previous fuel injection amount for the given fuel type may be increased. For example, the previous fuel injection amount may be a nominal, pre-calibrated value for an engine cold start or may be a previously updated value stored in a memory of the controller, such as the adjusted fuel injection amount determined during the previous engine cold start (e.g., determined according to method 300 during a previous execution). As an explanatory example, if the fuel is less volatile than estimated (e.g., the estimated fuel vapor pressure is higher than the actual fuel vapor pressure) and the confidence in the fuel vapor pressure estimate is not considered, then a smaller fuel injection amount may be set than optimal, resulting in engine hesitation still occurring. However, if the confidence is used to account for the inaccuracy of the fuel vapor pressure estimation, then the fuel injection amount may be decreased to a smaller degree (e.g., more conservatively), and engine hesitation may be reduced. Similarly, if the fuel is more volatile than estimated (e.g., the estimated fuel vapor pressure is lower than the actual fuel vapor pressure) and the confidence of the fuel vapor pressure estimate is not considered, then a larger fuel injection amount may be set than optimal, reducing fuel economy and increasing hydrocarbon emissions during the cold start. However, if the confidence is used to account for the inaccuracy of the fuel vapor pressure estimation, then the fuel injection amount may be increased to a smaller degree (e.g., more conservatively), and fuel economy may be improved while hydrocarbon emissions may be reduced. The controller may determine a control signal to send to the fuel injectors that has a pulse width corresponding to the adjusted fuel injection amount.

Optimizing the one or more combustion parameters may include adjusting a fraction of fuel injected via PFI versus DI, as indicated at 324, when the engine includes both port fuel and direct fuel injectors. For example, as the fuel vapor pressure decreases, the fraction of the fuel injected via PFI versus DI may be increased, as heavy-end hydrocarbons are more likely to increase particulate matter emissions if injected in DI mode. Furthermore, as the determined confidence increases, the degree to which the fraction of the fuel injected via PFI versus DI is adjusted from a previous fraction setting for the given fuel type may be increased. For example, the previous fraction setting may be a nominal, pre-calibrated value for an engine cold start or may be a previously updated value stored in a memory of the controller, such as the adjusted fraction of fuel injected via PFI versus DI determined during the previous engine cold start (e.g., determined according to method 300 during a previous execution). The controller may determine a first control signal to send to the port fuel injectors that has a first pulse width corresponding to the fraction of fuel to be injected via PFI and a second control signal to send to the direct fuel injectors with a second (different) pulse width corresponding to the fraction of fuel to be injected via DI.

Optimizing the one or more combustion parameters may include adjusting a commanded air-fuel ratio (AFR), as indicated at 326. For example, as the fuel vapor pressure decreases (and the fuel age increases), the richness of the commanded AFR (relative to stoichiometry) may be increased. Furthermore, as the determined confidence increases, the degree to which the commanded AFR is adjusted from a previous AFR setting for the given fuel type may be increased. For example, the previous AFR setting may be a nominal, pre-calibrated value for an engine cold start or may be a previously updated value stored in a memory of the controller, such as the adjusted commanded AFR determined during the previous engine cold start (e.g., determined according to method 300 during a previous execution). The adjusted commanded AFR may also influence the fuel injection amount (e.g., mass), as the controller may adjust the fuel injection amount based on a given air charge in order to achieve the commanded AFR, and further based on feedback from the exhaust gas oxygen sensor concerning the actual (e.g., achieved) AFR.

Optimizing the one or more combustion parameters may include adjusting a spark timing, as indicated at 328. For example, as the fuel vapor pressure decreases (e.g., the fuel volatility decreases), the spark timing (e.g., an ignition timing) may be further advanced (e.g., less retarded) to compensate for a delayed burn rate of lower volatility fuel. Furthermore, as the determined confidence increases, the degree to which the spark timing is adjusted from a previous spark timing setting for the given fuel type may be increased. For example, the previous spark timing setting may be a nominal, pre-calibrated value for an engine cold start or may be a previously updated setting stored in a memory of the controller, such as the adjusted spark timing determined during the previous engine cold start (e.g., determined according to method 300 during a previous execution). As an explanatory example, if the fuel is less volatile than estimated (e.g., the estimated fuel vapor pressure is higher than the actual fuel vapor pressure) and the confidence in the fuel vapor pressure estimate is not considered, then the spark timing may further retarded than optimal, decreasing fuel economy. However, if the confidence is used to account for the inaccuracy of the fuel vapor pressure estimation, then the spark timing may be retarded to a smaller degree (e.g., more conservatively), and fuel economy may be increased. Similarly, if the fuel is more volatile than estimated (e.g., the estimated fuel vapor pressure is lower than the actual fuel vapor pressure) and the confidence of the fuel vapor pressure estimate is not considered, then the spark timing may be further advanced (e.g., less retarded) than optimal, resulting in a higher occurrence of knock. However, if the confidence is used to account for the inaccuracy of the fuel vapor pressure estimation, then the spark timing may be advanced to a smaller degree (e.g., more conservatively), and fuel economy may be increased while the occurrence of knock is reduced. The controller may determine a control signal to send to an ignition system, such as a spark advance signal, to actuate the spark plug coupled to each engine cylinder at the adjusted spark timing.

At 330, method 300 includes starting the engine using the optimized combustion parameters. For example, the engine may be cranked at a non-zero speed (e.g., via a starter motor or an electric machine), the adjusted mass of fuel may be provided at the adjusted fuel injection timing (and adjusted PFI versus DI fuel fraction) to achieve the adjusted commanded AFR, and spark may be provided at the adjusted spark timing, such as by sending the control signals determined above. By starting the engine with one or more combustion parameters optimized for the fuel volatility, engine hesitation may be decreased, vehicle emissions may be decreased, and fuel performance may be increased. Following 330, method 300 ends.

Next, FIG. 4 shows a block diagram 400 of utilizing an example physics-based model 402 to determine a fuel vapor pressure and a plurality of combustion parameters therefrom during an engine cold start. Physics-based model 402 may be stored in a memory of a controller included in a vehicle control system, such as controller 12 of FIG. 2, and accessed according to a routine (e.g., method 300 of FIG. 3).

During an engine cold start, a fuel temperature (which may be estimated to be equivalent to an ambient temperature) and a fuel tank pressure (which may be estimated to be equivalent to barometric pressure) are input into physics-based model 402. Physics-based model 402 includes (or references) a plurality of fuel distillation curves 404, each of the plurality of fuel distillation curves empirically determined (e.g., in a laboratory setting) and stored in a memory of the controller. The plurality of fuel distillation curves 404 includes separate distillation curves for different fuel types (such as different fuel blends). Furthermore, the plurality of fuel distillation curves 404 includes separate distillation curves determined for each fuel type at different fuel ages (such as new fuel, 30 days aged fuel, 60 days aged fuel, 90 days aged fuel, etc.). In some examples, the plurality of fuel distillation curves 404 may include separate distillation curves determined at different pressures. Alternatively, the stored fuel distillation curves may be adjusted based on the fuel tank pressure according to known pressure-temperature relationships. Separate distillation curves included in the plurality of fuel distillation curves 404 are graphically represented by different line types (such as solid, dashed, dotted, etc.).

Physics-based model 402 may identify one or more of the plurality of fuel distillation curves 404 to reference based on the fuel type, the fuel age, and/or the fuel tank pressure. The fuel age may be estimated from a duration since a fuel refilling event as well as a fraction of new fuel added versus fuel remaining at the refilling event. For example, a weighted average age may be determined at the fuel refilling event, such as by the controller inputting the fraction of new fuel and the fraction of remaining fuel (as well as the estimated age of the remaining fuel) into a look-up table, algorithm, or model and outputting the weighted average age. The controller may update the estimated fuel age based on the weighted average age and the duration since the fuel refilling event, which may be stored in a memory of the controller.

The horizontal axis of each of the plurality of fuel distillation curves represents a fuel evaporative percentage, while the vertical axis represents a corresponding temperature for a given fuel evaporative percentage. However, in other examples, the vertical axis may represent the fuel evaporative percentage and the horizontal axis may represent the temperature. Physics-based model 402 references the fuel temperature against the one or more identified fuel distillation curves to output the estimated fuel vapor pressure for the given fuel tank pressure, fuel type, and fuel age. In this way, physics-based model 402 takes into account the vapor pressure of heavy-end hydrocarbons (which are less volatile and may comprise a greater fraction of the fuel as the fuel age increases) versus light-end hydrocarbons (which are more volatile and may comprise a smaller fraction of the fuel as the fuel age increases).

Once the fuel vapor pressure is determined using the plurality of distillation curves 404, it may be directly used to determine a correction factor, which is then output from physics based model 402 and input into a fuel logic 405 of the controller. For example, physics-based model 402 may include a look-up table that correlates the determined fuel vapor pressure with a corresponding correction factor. As another example, the controller may make a logical determination of the correction factor based on logic rules that are a function of the determined fuel vapor pressure. Alternatively, the estimated fuel vapor pressure may be input directly into fuel logic 405. Fuel logic 405 references a plurality of look-up tables, algorithms, or maps 406 to determine a plurality of combustion parameters. For example, the correction factor may be input into the plurality of look-up tables 406 along with a confidence and an estimated octane number to determine the corresponding combustion parameters for the input parameters. As described with respect to FIG. 3, in some examples, the confidence may be determined based on an engine-off time and a probability that the fuel tank pressure and fuel temperature are accurate based on the engine-off time, such as determined using a probability model 408, which may be a Gaussian probability distribution. However, in other examples, the confidence may not be included as an input into fuel logic 405. As also described with respect to FIG. 3, in some examples, the estimated octane number may be determined using a knock adaptation module 410. In other examples, the estimated octane number may be determined based on the fuel type and may further be adjusted based on ambient humidity. In still other examples, the fuel octane number may be accounted for in the referenced fuel distillation curve (e.g., input into physics-based model 402) and may not be input into fuel logic 405. A plurality of combustion parameters may be output from fuel logic 405 and the plurality of look-up tables 406, including fuel injection timing, fuel mass, PFI versus DI fuel fraction, an AFR, and a spark timing. In some examples, a separate look-up table may be referenced for each of the plurality of combustion parameters. In other examples, a subset of the plurality of combustion parameters may be referenced in a single look-up table. The controller may then use the plurality of combustion parameters to control fueling and ignition during the engine cold start. With the fuel composition (e.g., light ends versus heavy ends), and therefore the volatility, accounted for, vehicle emissions may be decreased.

Next, FIG. 5 shows a set of graphs 500 and 510 illustrating an example relationship between an engine-off time, a confidence in an estimated fuel vapor pressure, and a degree of an adjustment made to a combustion parameter (e.g., fuel injection timing, fuel injection amount, PFI versus DI fuel fraction, commanded AFR, or spark timing) during an engine cold start. As described above with respect to FIGS. 3 and 4, the fuel vapor pressure may be estimated based on an estimated fuel temperature and an estimated fuel tank pressure. In particular, ambient temperature (e.g., as measured by ambient temperature sensor 198 of FIGS. 1 and 2) may be used as the estimated fuel temperature. The fuel temperature may not have reached the ambient temperature depending on the engine-off time (e.g., a duration of engine inactivity), such as if an engine cold start is requested when the fuel system has not reached thermal equilibrium with the environment.

Graph 500 shows an example plot 502 of the relationship between the engine-off time and the confidence in the fuel vapor pressure estimation. The horizontal axis represents the engine-off time, with the engine-off time increasing along the horizontal axis from left to right. The vertical axis represents the confidence in the fuel vapor pressure estimation, with the confidence increasing along the vertical axis from bottom to top until a maximum confidence is reached. Furthermore, a threshold engine-off time is indicated by dashed line 504. The threshold engine-off time refers to an engine-off time at which it may be assumed with maximum confidence that the fuel system is in thermal equilibrium with the environment. The threshold engine-off time may be the second threshold duration described with respect to 316 of FIG. 3, for example.

Graph 510 shows an example plot 512 of the relationship between the confidence in the fuel vapor pressure estimation and the degree of the adjustment made to the combustion parameter. The horizontal axis represents the confidence in the fuel vapor pressure estimation, with the confidence increasing along the horizontal axis from left to right. The vertical axis represents the degree of the adjustment made to the combustion parameter, with the degree of the adjustment increasing along the vertical axis from bottom to top until a maximum degree of adjustment is reached. For example, the maximum degree of adjustment may refer to the adjustment made at maximum confidence. The degree of adjustment refers to an adjustment from a previous setting, such as described with respect to FIG. 3. Further, depending on the combustion parameter and the estimated fuel vapor pressure, the adjusting may be in an increasing or decreasing direction.

As illustrated by plot 502 of graph 500, as the engine-off time increases, the confidence increases until the maximum confidence is reached at the threshold engine-off time (dashed line 504). Thus, at engine-off times greater than the threshold engine-off time, the confidence does not continue to increase. Plot 502 shows a non-linear relationship between the engine-off time and the confidence. However, other curve shapes are also possible, such as linear and other non-linear curves wherein the confidence generally increases as the engine-off time increases. Furthermore, the shape of plot 502 may vary based on the fuel amount, the ambient temperature at engine shutdown, the current engine temperature, and the fuel temperature at engine shutdown, for example. Similarly, as illustrated by plot 512 of graph 510, as the confidence increases, the degree of the adjustment increases until the maximum degree of adjustment is reached. Plot 512 shows a linear relationship between the confidence and the degree of the adjustment. However, other curve shapes are also possible, such as non-linear curves wherein the degree of the adjustment generally increases as the confidence increases. Furthermore, the shape of plot 512 may vary based on the combustion parameter. As non-limiting examples, the degree of fuel injection amount adjustment may increase linearly with confidence, while the degree of spark timing adjustment may increase step-wise with confidence.

As an illustrative example, first referring to graph 500, an engine-off time t1, which is less than the threshold engine-off time (dashed line 504), corresponds to a confidence c1, which is less than the maximum confidence. An engine-off time t2, which is less than the threshold engine-off time (dashed line 504) and greater than the engine-off time t1, corresponds to a confidence c2. The confidence c2 is greater than the confidence c1 and less than the maximum confidence. Referring next to graph 510, the confidence c1 corresponds to a degree of adjustment d1, and the confidence c2 corresponds to a degree of adjustment d2. The degree of adjustment d1 is less than the degree of adjustment d2, which are both less than the maximum degree of adjustment. Thus, as illustrated by graphs 500 and 510, when the engine-off time is less than the threshold time (dashed line 504), the combustion parameter is adjusted from the previous setting to a greater degree (e.g., more aggressively adjusted) when the engine off-time is longer (e.g., the engine-off time t2) and the confidence in the fuel vapor pressure estimation is higher (e.g., the confidence c2), compared with when the engine off-time is shorter (e.g., the engine-off time t1).

FIG. 6 shows a set of example graphs 600, 610, and 620 illustrating how an estimated fuel vapor pressure range may be used to adjust a combustion parameter during an engine cold start. As an explanatory example, fuel injection amount is used as the combustion parameter in FIG. 6. Graph 600 illustrates a relationship between fuel temperature and engine-off time. The horizontal axis represents the engine-off time, with the engine-off time increasing along the horizontal axis from left to right. The vertical axis represents the fuel temperature, with the fuel temperature increasing along the vertical axis from bottom to top. An ambient temperature, which is used to estimate the fuel temperature in the example of FIG. 6, is indicated by dashed line 602. Graph 610 illustrates a relationship between the fuel vapor pressure and the fuel temperature. The horizontal axis represents the fuel temperature, with the fuel temperature increasing along the horizontal axis from left to right. The vertical axis represents the fuel vapor pressure, with the fuel vapor pressure increasing along the vertical axis from bottom to top. Graph 620 illustrates a relationship between the fuel vapor pressure and the fuel injection amount. The horizontal axis represents the fuel vapor pressure, with the fuel vapor pressure increasing along the horizontal axis from left to right. The vertical axis represents the fuel injection amount, with the fuel injection amount increasing along the vertical axis from bottom to top.

Referring first to graph 600, plot 604 shows a temperature decay curve from a starting fuel temperature when the engine is turned off (e.g., at engine off time t0). The shape of plot 604 may be determined in part based on the ambient temperature and the starting fuel temperature, which may be estimated based on operating conditions at t0, for example. Plot 606 shows an inverse of the temperature decay curve, which may be used together with plot 604 to determine an estimated fuel temperature range ($\delta$) for a given engine-off time. As the engine-off time increases, plots 604 and 606 approach the ambient temperature (dashed line 602) and a span of the temperature range decreases until the temperature range is equal to a single value (e.g., the ambient temperature). For example, at engine-off times greater than an engine-off time t3, the fuel temperature is equilibrated with the ambient temperature, and the ambient temperature alone is used to represent the estimated fuel temperature. A time value of engine-off time t3 varies based on the ambient temperature and the shape of plots 604 and 606. At engine-off times that are less than the engine-off time t3, the temperature range may be determined using plots 604 and 606. Furthermore, it may be assumed with high (e.g., 95%) confidence that the actual fuel temperature is within the temperature range. For example, at an engine-off time t1, plot 604 defines an upper bound and plot 606 defines a lower bound of a temperature range δ1. Similarly, at an engine-off time t2, which is longer than the engine off-time t1, plot 604 defines an upper bound and plot 606 defines a lower bound of a temperature range δ2, which is smaller than the temperature range δ1. Thus, as demonstrated by graph 600, as the engine off time increases the span of the estimated fuel temperature range decreases, corresponding to an increase in a confidence that the fuel temperature is equal to the ambient temperature. As demonstrated by graph 600, each of the temperature ranges δ1 and δ2 is centered about the ambient temperature (dashed line 602).

Referring to graph 610, a plot 611 shows a relationship between the fuel temperature and the fuel vapor pressure. Plot 611 may be derived from a distillation curve, for example. As in graph 600, dashed line 602 refers to the ambient temperature, which corresponds to a fuel vapor pressure 612. Small dashed line 604*a* indicates the upper bound of temperature range δ1, which corresponds to a fuel vapor pressure 614*a*, and small dashed line 606*a* indicated the lower bound of temperature range δ1, which corresponds to a fuel vapor pressure 616*a*. Together, 614*a* and 616*a* define the upper and lower bounds, respectively, of an estimated fuel vapor pressure range α1 that corresponds to the engine-off time t1. Similarly, dotted line 604*b* indicates the upper bound of temperature range δ2, which corresponds to a fuel vapor pressure 614*b*, and dotted line 606*b* indicates the lower bound of temperature range δ2, which corresponds to a fuel vapor pressure 616*b*. Together, 614*b* and 616*b* define the upper and lower bounds, respectively, of an estimated fuel vapor pressure range α2 that corresponds to the engine-off time t2. The estimated fuel vapor pressure range α2 is smaller than the estimated fuel vapor pressure range α1, as a confidence that the actual fuel vapor pressure is equal to the fuel vapor pressure estimated from the ambient temperature increases.

Referring next to graph 620, an example plot 621 shows a relationship between the fuel vapor pressure and the fuel injection amount. As the fuel vapor pressure, and thus the fuel volatility, increases, the fuel injection amount decreases. Plot 621 shows a non-linear relationship between the fuel vapor pressure and the fuel injection amount. However, other curve shapes are also possible, such as linear and other non-linear curves wherein the fuel injection amount generally decreases as the fuel vapor pressure increases. As in graph 610, dashed line 612 refers to the fuel vapor pressure determined from the ambient temperature, which corresponds to a fuel injection amount 622 using the relationship shown in plot 621. Similarly, the upper and lower bounds of the estimated fuel vapor pressure range α1 (indicated by small dashed lines 614*a* and 616*a*, respectively) correspond to fuel injection amounts 624*a* and 626*a*, respectively. The upper and lower bounds of the estimated fuel vapor pressure range α2 (indicated by small dotted lines 614*b* and 616*b*, respectively) correspond to fuel injection amounts 624*b* and 626*b*, respectively. Because the estimated fuel vapor pressure range α1 is greater than the estimated fuel vapor pressure range α2, the difference between fuel injection amounts 626*a* and 624*a* is greater than the difference between fuel injection amounts 626*b* and 624*b*. In order to mitigate engine hesitation during the engine cold start, for example, a controller (e.g., controller 12 of FIG. 2) may select the most conservative fuel injection amount for each estimated fuel vapor pressure range. For example, fuel injection amount 626*a* may be selected for the estimated fuel vapor pressure range α1, and fuel injection amount 626*b* may be selected for the estimated fuel vapor pressure range α2. Both fuel injection amount 626*a* and fuel injection amount 262*b* are larger than the fuel injection amount 622 corresponding to the ambient temperature 612. As a result, engine hesitation during the engine cold start may be reduced by ensuring that the fuel vapor pressure (and hence the fuel volatility) is not overestimated by using the ambient temperature as an estimate of the fuel temperature.

In this way, a physics-based model may determine a vapor pressure (and therefore a volatility) of aged fuel with high accuracy, enabling combustion parameters, such as fuel injection timing, fuel injection amount, PFI versus DI fuel fraction, spark timing, and AFR, to be optimized for the determined vapor pressure. As a result, fuel volatility, which decreases with fuel age, is accounted for, reducing engine hesitation and emissions during a cold start and increasing fuel performance. Furthermore, the combustion parameters may be further adjusted based on additional fuel characteristics (e.g., octane number, fuel type, etc.) as well as a confidence in the accuracy of the determined vapor pressure. As a result, over-adjustment and under-adjustment in the combustion parameters may be avoided, further reducing engine hesitation, vehicle emissions and operator dissatisfaction due to aged fuel during a cold start.

The technical effect of adjusting one or more combustion parameters during an engine start based on an estimated fuel vapor pressure is that engine hesitation and vehicle emissions may be decreased.

As one example, a method comprises: during a cold start of a fuel burning engine, estimating a vapor pressure of fuel stored in a fuel tank via a pre-determined fuel distillation curve; and adjusting combustion parameters based on the estimated vapor pressure. In the preceding example, additionally or optionally, the pre-determined fuel distillation curve is selected from a plurality of pre-determined fuel distillation curves based on one or more fuel characteristics. In any or all of the preceding examples, additionally or optionally, the one or more fuel characteristics include alcohol content and fuel octane number. In any or all of the preceding examples, additionally or optionally, the fuel octane number is determined in part based on an output of a knock sensor coupled to the engine. In any or all of the preceding examples, additionally or optionally, estimating the fuel vapor pressure via the pre-determined fuel distillation curve includes inputting a temperature of the fuel and a pressure of the fuel into a physics-based model that references the pre-determined fuel distillation curve. In any or all of the preceding examples, additionally or optionally, the fuel tank is vented to atmosphere, the temperature of the fuel is assumed to be ambient temperature, and the fuel tank pressure is assumed to be barometric pressure. In any or all of the preceding examples, additionally or optionally, the fuel burning engine comprises an internal combustion engine having a plurality of cylinders each receiving fuel directly into the cylinder from a direct injector and each receiving fuel through an intake port from a port injector, and wherein the combustion parameters include one or more of a fuel injection amount from the direct injector and/or the port injector, a fuel injection timing of the port injector and/or the direct injector, a port fuel injection versus direct fuel injection fuel fraction, a commanded air-fuel ratio, and an ignition timing. In any or all of the preceding examples, additionally or optionally, adjusting the combustion parameters based on the estimated vapor pressure includes updating a setting of each combustion parameter from a previous setting and initiating a starting operation of the engine with each updated setting.

As another example, a method comprises: in response to an engine start request during a cold start condition, estimating a volatility of fuel stored in a fuel tank using a physics-based model; determining a confidence in the estimated volatility based on a duration of engine inactivity; and adjusting an injection amount and an injection timing of fuel delivered to the engine from the fuel tank based on the estimated volatility and the determined confidence. In the preceding example, additionally or optionally, the physics-based model includes a plurality of empirically determined fuel distillation curves, and estimating the volatility of the fuel stored in the fuel tank using the physics based model includes selecting a fuel distillation curve from the plurality of empirically determined fuel distillation curves based on at least one of an octane number, an age, and a type of the fuel stored in the fuel tank. In any or all of the preceding examples, additionally or optionally, estimating the volatility of the fuel stored in the fuel tank using the physics based model further comprises estimating a fuel vapor pressure via the selected fuel distillation curve based on a current fuel temperature and a current fuel tank pressure. In any or all of the preceding examples, additionally or optionally, the current fuel temperature is estimated as an ambient temperature measured by an ambient temperature sensor, and the current fuel tank pressure is estimated as barometric pressure measured by an ambient pressure sensor. In any or all of the preceding examples, additionally or optionally, the determined confidence in the estimated fuel volatility increases as the duration of engine inactivity increases until a maximum confidence is reached at a threshold duration of engine inactivity. In any or all of the preceding examples, additionally or optionally, adjusting the injection amount and the injection timing based on the estimated volatility and the determined confidence comprises: increasing the injection amount from a previous injection amount setting as the estimated volatility decreases, with the injection amount increased to a larger degree as the determined confidence increases and increased to a smaller degree as the determined confidence decreases; decreasing the injection amount from the previous injection amount setting as the estimated volatility increases, with the injection amount decreased to a larger degree as the determined confidence increases and decreased to a smaller degree as the determined confidence decreases; advancing the injection timing from a previous injection timing setting as the estimated volatility decreases, with the injection timing advanced to a larger degree as the determined confidence increases and advanced to a smaller degree as the determined confidence decreases; and retarding the injection timing from the previous injection timing setting as the estimated volatility increases, with the injection timing retarded to a larger degree as the determined confidence increases and retarded to a smaller degree as the determined confidence decreases.

As another example, a system for a vehicle comprises: an engine including a plurality of cylinders, each cylinder including a spark plug and a fuel injector for delivering fuel; a fuel system, including a fuel tank for storing the fuel; an evaporative emissions system in fluidic communication with the fuel system, the evaporative emissions system coupled to atmosphere via a vent; an ambient temperature sensor coupled to an intake passage of the engine; an ambient pressure sensor coupled to the intake passage of the engine; an engine coolant temperature sensor coupled to a cooling sleeve of the engine; and a controller holding executable instructions in non-transitory memory that, when executed, cause the controller to: determine an engine cold start condition based on an output of the engine coolant temperature sensor and an engine start request; estimate a vapor pressure of the fuel in response to the determination of the engine cold start condition using a physics-based model; and adjust a pulse width and/or timing of signals sent to the fuel injector and the spark plug based on the estimated vapor pressure and an engine-off time. In the preceding example, the system additionally or optionally comprises a fuel tank isolation valve coupled between the fuel system and the evaporative emissions system, and wherein the fuel tank isolation valve is a normally open valve. In any or all of the preceding examples, the system additionally or optionally further comprises an autonomous vehicle control system, wherein the autonomous vehicle control system stores executable instructions in non-transitory memory that enable the vehicle to be operated without input from an operator. In any or all of the preceding examples, additionally or optionally, the estimated vapor pressure is a range of vapor pressure values determined based on an ambient temperature measured by the ambient pressure sensor, a temperature decay function, and the engine-off time, a span of the range decreasing as the engine-off time increases. In any or all of the preceding examples, additionally or optionally, adjusting a pulse width and/or timing of signals sent to the fuel injector and the spark plug includes selecting a most conservative adjustment for the range of vapor pressure values. In any or all of the preceding examples, additionally or optionally, the vapor pressure is estimated based on the ambient temperature and the ambient pressure, and adjusting a pulse width and/or timing of signals sent to the fuel injector and the spark plug based on the estimated vapor pressure and the engine-off time further comprises: determining a confidence in the estimated fuel vapor pressure based on the engine-off time; increasing the pulse width of the signal sent to the fuel injector from a previously determined pulse width as the estimated vapor pressure decreases, the pulse width of the signal increased to a larger degree as the confidence increases; and advancing the timing of the signal sent to the spark plug from a previously determined timing as the estimated vapor pressure decreases, the timing of the signal advanced to a larger degree as the confidence increases.

In another representation, a method for a hybrid electric vehicle comprises: prior to a transition from an electric mode to an engine mode of operation, estimating a vapor pressure of fuel stored in a fuel tank via a pre-determined fuel distillation curve; and adjusting combustion parameters based on the estimated vapor pressure. In the preceding example, additionally or optionally, the method further comprises determining a confidence in the estimated fuel vapor pressure based on a duration of engine inactivity; and adjusting the combustion parameters further based on the determined confidence. In any or all of the preceding examples, additionally or optionally, estimating the fuel vapor pressure via the pre-determined fuel distillation curve includes inputting a temperature of the fuel and a pressure of the fuel into a physics-based model that references the pre-determined fuel distillation curve. In any or all of the preceding examples, additionally or optionally, the fuel tank is vented to atmosphere via a fuel vapor storage canister, the temperature of the fuel is assumed to be ambient temperature, and the fuel tank pressure is assumed to be barometric pressure. In any or all of the preceding examples, additionally or optionally, the estimated fuel vapor pressure is further adjusted based on a purge compensation factor determined during a previous purge event of the fuel vapor storage canister. In any or all of the preceding examples, additionally or optionally, the method further comprises starting the engine with the adjusted combustion parameters.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
during a cold start of a fuel burning engine,
estimating a vapor pressure of fuel stored in a fuel tank based on a temperature of the fuel using a pre-determined fuel distillation curve that relates the temperature of the fuel to a percentage of the fuel evaporated, the pre-determined fuel distillation curve selected from a plurality of pre-determined fuel distillation curves; and
adjusting combustion parameters based on the estimated vapor pressure.

2. The method of claim 1, wherein the pre-determined fuel distillation curve is selected from the plurality of pre-determined fuel distillation curves based on one or more characteristics of the fuel stored in the fuel tank.

3. The method of claim 2, wherein the one or more characteristics of the fuel stored in the fuel tank include an alcohol content, a fuel age, a pressure in the fuel tank, and a fuel octane number.

4. The method of claim 3, wherein the fuel octane number is determined in part based on an output of a knock sensor coupled to the engine.

5. The method of claim 1, wherein estimating the vapor pressure of the fuel stored in the fuel tank based on the temperature of the fuel using the pre-determined fuel distillation curve includes inputting the temperature of the fuel and a pressure of the fuel into a physics-based model that references the pre-determined fuel distillation curve.

6. The method of claim 5, wherein the fuel tank is vented to atmosphere, the temperature of the fuel is assumed to be ambient temperature, and the fuel tank pressure is assumed to be barometric pressure.

7. The method of claim 1, wherein the fuel burning engine comprises an internal combustion engine having a plurality of cylinders each receiving fuel directly into a cylinder from a direct injector and each receiving fuel through an intake port from a port injector, and wherein the combustion parameters include one or more of a fuel injection amount from the direct injector and/or the port injector, a fuel injection timing of the port injector and/or the direct injector, a port fuel injection versus direct fuel injection fuel fraction, a commanded air-fuel ratio, and an ignition timing.

8. The method of claim 7, wherein adjusting the combustion parameters based on the estimated vapor pressure includes updating a setting of each combustion parameter from a previous setting and initiating a starting operation of the engine with each updated setting.

9. A method, comprising:
in response to an engine start request during a cold start condition,
estimating a volatility of fuel stored in a fuel tank using a physics-based model;
determining a confidence in the estimated volatility based on a duration of engine inactivity, the confidence being a probability that a current fuel temperature is within a determined range; and
adjusting an injection amount and an injection timing of fuel delivered to the engine from the fuel tank based on the estimated volatility and the determined confidence, a degree of adjustment to the injection amount and the injection timing increasing as the determined confidence increases.

10. The method of claim 9, wherein the physics-based model includes a plurality of empirically determined fuel distillation curves, and estimating the volatility of the fuel stored in the fuel tank using the physics-based model includes selecting a fuel distillation curve from the plurality of empirically determined fuel distillation curves based on at least one of an octane number, an age, and a type of the fuel stored in the fuel tank.

11. The method of claim 10, wherein estimating the volatility of the fuel stored in the fuel tank using the physics-based model further comprises estimating a fuel vapor pressure via the selected fuel distillation curve based on the current fuel temperature and a current fuel tank pressure.

12. The method of claim 11, wherein the current fuel temperature is estimated as an ambient temperature measured by an ambient temperature sensor, and the current fuel tank pressure is estimated as barometric pressure measured by an ambient pressure sensor.

13. The method of claim 9, wherein the determined confidence in the estimated fuel volatility increases as the duration of engine inactivity increases until a maximum confidence is reached at a threshold duration of engine inactivity.

14. The method of claim 9, wherein adjusting the injection amount and the injection timing based on the estimated volatility and the determined confidence, the degree of adjustment to the injection amount and the injection timing increasing as the determined confidence increases, comprises:
  increasing the injection amount from a previous injection amount setting as the estimated volatility decreases, with the injection amount further increased as the determined confidence increases;
  decreasing the injection amount from the previous injection amount setting as the estimated volatility increases, with the injection amount further decreased as the determined confidence increases;
  advancing the injection timing from a previous injection timing setting as the estimated volatility decreases, with the injection timing further advanced as the determined confidence increases; and
  retarding the injection timing from the previous injection timing setting as the estimated volatility increases, with the injection timing further retarded as the determined confidence increases.

15. A system for a vehicle, comprising:
  an engine including a plurality of cylinders, each cylinder including a spark plug and a fuel injector for delivering fuel;
  a fuel system, including a fuel tank for storing the fuel;
  an evaporative emissions system in fluidic communication with the fuel system, the evaporative emissions system coupled to atmosphere via a vent;
  an ambient temperature sensor coupled to an intake passage of the engine;
  an ambient pressure sensor coupled to the intake passage of the engine;
  an engine coolant temperature sensor coupled to a cooling sleeve of the engine; and
  a controller holding executable instructions in non-transitory memory that, when executed, cause the controller to:
    determine an engine cold start condition based on an output of the engine coolant temperature sensor and an engine start request;
    estimate a vapor pressure of the fuel in response to the determination of the engine cold start condition using a physics-based model that relates a temperature of the fuel to an evaporative percentage of the fuel via an empirically determined fuel distillation curve, the empirically determined fuel distillation curve selected from a plurality of empirically determined fuel distillation curves stored in the non-transitory memory; and
    adjust a pulse width and/or timing of signals sent to the fuel injector and the spark plug based on the estimated vapor pressure and an engine-off time.

16. The system of claim 15, further comprising a fuel tank isolation valve coupled between the fuel system and the evaporative emissions system, and wherein the fuel tank isolation valve is a normally open valve.

17. The system of claim 15, further comprising an autonomous vehicle control system, wherein the autonomous vehicle control system stores executable instructions in non-transitory memory that enable the vehicle to be operated without input from an operator.

18. The system of claim 15, wherein the temperature of the fuel is an ambient temperature measured by the ambient temperature sensor, and the estimated vapor pressure is a range of vapor pressure values determined based on the ambient temperature, a temperature decay function, and the engine-off time, a span of the range decreasing as the engine-off time increases.

19. The system of claim 18, wherein adjusting the pulse width and/or timing of signals sent to the fuel injector and the spark plug includes selecting a most conservative adjustment for the range of vapor pressure values.

20. The system of claim 15, wherein adjusting the pulse width and/or timing of signals sent to the fuel injector and the spark plug based on the estimated vapor pressure and the engine-off time further comprises:
  determining a confidence in the estimated fuel vapor pressure based on the engine-off time;
  increasing the pulse width of the signal sent to the fuel injector from a previously determined pulse width as the estimated vapor pressure decreases, the pulse width of the signal increased to a larger degree as the confidence increases; and
  advancing the timing of the signal sent to the spark plug from a previously determined timing as the estimated vapor pressure decreases, the timing of the signal advanced to a larger degree as the confidence increases.

* * * * *